(12) United States Patent
Sharma et al.

(10) Patent No.: US 8,587,881 B2
(45) Date of Patent: Nov. 19, 2013

(54) MINIATURE LENSES, SYSTEMS AND METHODS OF MAKING THE SAME

(75) Inventors: Ashutosh Sharma, Kanpur (IN); Ankur Verma, Kanpur (IN)

(73) Assignee: Indian Institute of Technology Kanpur, Kanpur (IN)

( * ) Notice: Subject to any disclaimer, the term of this patent is extended or adjusted under 35 U.S.C. 154(b) by 69 days.

(21) Appl. No.: 13/176,565

(22) Filed: Jul. 5, 2011

(65) Prior Publication Data

US 2013/0010368 A1 Jan. 10, 2013

(51) Int. Cl.
G02B 3/00 (2006.01)
(52) U.S. Cl.
USPC .......................................................... 359/796
(58) Field of Classification Search
CPC .... G02B 3/0006; G02B 3/0037; G02B 7/021; G02B 227/101
USPC .......................................... 359/642, 664, 796
See application file for complete search history.

(56) References Cited

U.S. PATENT DOCUMENTS

2004/0027680 A1* 2/2004 Ozawa .......................... 359/642
2006/0176569 A1* 8/2006 Yoshida et al. ............... 359/626
2008/0037131 A1* 2/2008 Steenblik et al. ............. 359/619

FOREIGN PATENT DOCUMENTS

WO 2007025004 A2 3/2007
WO 2007025023 A2 3/2007

OTHER PUBLICATIONS

Baralia, et al., "Nanodecoding by Dewetting," *Adv. Mater.*, 19:4453-4459, 2007.
Calo, et al. "Time-Temperature Integrator Based on the Dewetting of Polyisobutylene Thin Films," *Langmuir*, 26(8):5312-5315, 2010.
Cavallini, et al., "Nanopatterning Soluble Multifunctional Materials by Unconventional Wet Lithography," *Adv. Mater.* 21:1043-1053, 2009.
Craster, et al., "Dynamics and stability of thin liquid films," *Rev. Mod. Phys.*, 81:1131-1198, 2009.
Geoghegan, et al., "Thin polymer films on chemically patterned, corrugated substrates," *J. Phys.: Condens. Matter.*, 17:S389-S402, 2005.
Harant, et al., "Solvent vapor annealed block copolymer films on organosilane self-assembled Monolayers," *J. Vac. Sci. Technol.* B 23:1615, (7 pages) 2005. Abstract only.
Hell, S.W., "Far-Field Optical Nanoscopy," *Science*, 316:1153-1158, 2007.
Higgins, A.M., et al., "Anisotropic spinodal dewetting as a route to self-assembly of patterned surfaces," *Nature*, 404:476-478; Mar. 30, 2000.

(Continued)

*Primary Examiner* — Darryl J Collins
(74) *Attorney, Agent, or Firm* — Knobbe, Martens, Olson & Bear LLP

(57) ABSTRACT

Techniques related to miniature lenses and lens arrays are generally described herein. The described techniques may be embodied in apparatuses, systems, methods and/or processes for making and using such lenses. In some examples, the various techniques may be utilized for miniature lenses such as nanometer to micron sized spherical lenses or lens arrays. An example process may include dewetting polymer films to form such lenses. The resulting lens-size may be tunable from about 200 nm to a few tens of microns, and more particularly in a range from about 200 nm to about 10 μm with spherical shapes of contact angles ranging from about 30° to about 150°. The resulting lenses may be tunable polymeric structures formed generally by self-organized room temperature dewetting of ultrathin polymer films by reducing the surface tension.

29 Claims, 9 Drawing Sheets

(56) References Cited

OTHER PUBLICATIONS

Julthongpiput, et al., "Pattern-directed to isotropic dewetting transition in polymer films on micropatterned surfaces with differential surface energy contrast," *Soft Matter*, 3:613-618, 2007.

Kim, et al., "Low-Duty-Ratio Patterning on a Heterogeneous Surface," *Adv. Funct. Mater.*, 15:1445-1450, 2005.

Lee, et al., "Fabrication of polymer micro/nano-hybrid lens array by microstructured anodic aluminum oxide (AAO) mold," *Microelectronic Engineering* vol. 86, Issues 4-6, pp. 857-860, Apr.-Jun. 2009.

Liu, et al., "Far-Field Optical Hyperlens Magnifying Sub-Diffraction-Limited Objects," *Science*, 315:1686, 2007.

Pendry, J.B., "Negative Refraction Makes a Perfect Lens," *Phys. Rev. Lett.*, 85(18):3966-3969, 2000.

Reiter, G., "Dewetting of Thin Polymer Films," *Phys. Rev. Lett.*, 68(1):75-80, 1992.

Reiter, G., "Unstable Thin Polymer Films: Rupture and Dewetting Processes," *Langmuir*, 9:1344-1351, 1993.

Seemann, et al., "Dewetting Patterns and Molecular Forces: A Reconciliation," *Phys. Rev. Lett.*, 86(24):5534-5537, 2001.

Sehgal, et al., "Pattern-Directed Dewetting of Ultrathin Polymer Films," *Langmuir* 18:7041-7048, 2002.

Sharma, et al., "Instability of Thin Polymer Films on Coated Substrates: Rupture, Dewetting, and Drop Formation," *J. Colloid Interface Sci.*, 178:383-399, 1996.

Sharma, et al., "Pattern Formation in Unstable Thin Liquid Films," *Phys. Rev. Lett.*, 81(16):3463-3466, 1998.

Suh, et al., "Self-Organized Polymeric Microstructures," *Adv. Mater.*, 14:346-351, 2002.

Tong, et al., "Mixed Solvent Induced Dewetting of Polystyrene Thin Film," *Chemical Journal of Chinese Universities*, 32(4):995-1000, 2011.

Verma, et al., "Enhanced Self-Organized Dewetting of Ultrathin Polymer Films Under Water-Organic Solutions: Fabrication of Submicrometer Spherical Lens Arrays," *Adv. Mater.*, vol. 22(6) pp. 5306-5309, 2010.

Voelkel, Reinhard, "Micro-Optics: From High-End to Mass-Market Wafer-based technology now provides high-quality micro-optics for low-cost consumer products," *Optik & Photonik* No. 4 Micro-Optics: From High-End to Mass-Market, pp. 36-40, Dec. 2009.

Xie, et al., "Spinodal Dewetting of Thin Polymer Films," *Phys. Rev. Lett.*, 81(6):1251-1254, 1998.

Yoon, et al., "Nanopatterning of thin polymer films by controlled dewetting on a topographic pre-pattern," *Soft Matter*, 4:1467-1472, 2008.

Dume, B., "Nano-lens moves on," Updated on May 10, 2008, accessed at http://nanotechweb.org/cws/article/tech/33288, accessed on Apr. 25, 2013.

"Nano-lens goes cup-shaped," Updated on Aug. 5, 2009, accessed at http://optics.org/article/40028, accessed on May 29, 2013.

* cited by examiner

MINIATURE LENSES, SYSTEMS AND METHODS OF MAKING THE SAME

BACKGROUND

Unless otherwise indicated herein, the materials described in this section are not prior art to the claims in this application and are not admitted to be prior art by inclusion in this section.

Conventional optical lenses can create images by capturing the light waves emitted by an object and then bending them. However, objects may also emit "evanescent" waves containing a lot of information at very small scales that can be much harder to measure. This is because the evanescent waves decay exponentially and thus may never reach the image plane—a threshold in optics known as the diffraction limit.

The diffraction limit can prevent resolving two objects closer than half the wavelength of light using lens-based far-field optics. For a finer optical resolution, one usually employs a lensing effect by surface-plasmon excitation or fluorescence microscopy involving molecular excitations. Until very recently, the only practical way to see sub-diffraction limited features was by using a near-field optical microscope which can capture evanescent waves using a nanosized mechanical tip.

In recent years there have been various efforts to recover and project the evanescent waves into the far field. Metamaterials-based superlenses with properties such as negative refractive index offer one possible solution to overcome the diffraction limit. Use of spherical microlenses and nanolenses may offer new possibilities of lens-based near-field detection and high resolution optical imaging at low intensities. These lenses can be shown to provide lens-based near-field focusing in high resolution optical microscopy.

New types of self-assembled nanolenses that may overcome the diffraction limit of light are an exciting new area of research. Such nanolenses may allow features as small as 200 nm to be resolved. In biological systems there are several examples of arrays of miniaturized lenses such as insect's compound eyes. The present disclosure appreciates that miniature lenses (e.g., microlenses or nanolenses) can be adapted for use in a variety of optical devices like charge-coupled device (CCD), digital projectors and photovoltaics. Fabrication of such microlenses and/or nanolenses (i.e., hereinafter simply miniature lenses) can be carried out by a top-down approach using sophisticated tools like lithography, contact printing, inkjet printing, focused ion beam, and UV laser etc., where some examples may use a self-assembly process for fabricating a single lens. The present disclosure appreciates the possibilities associated with the use of miniature lenses, and thus identifies that there is a need for a commercially feasible method for fabricating such lenses.

SUMMARY

Some embodiments disclosed herein may include a method of making a plurality of miniature lenses including: providing a film on a patterned substrate, where the film comprises a polymer; transitioning the polymer to a viscous state to form a viscous state polymer; facilitating the formation of a plurality of miniature lenses from the viscous state polymer; and transitioning the viscous state polymer in the miniature lenses from the viscous state to a rigid state.

Some embodiments disclosed herein may include a system of miniature lenses including: a substrate having one or more patterns, where each of the patterns includes a repeating unit; and a plurality of miniature lenses disposed on the substrate, where a size of the repeating unit corresponds to a size of the miniature lenses.

Some embodiments disclosed herein may include a system including: a controller configured to execute instructions to facilitate making a plurality of miniature lenses; a polymer delivery device coupled to the controller, where the polymer delivery device is configured via the controller to provide a polymer film to a patterned substrate; and a dewetting device coupled to the controller, where the dewetting device is configured via the controller to dewet the polymer film into a plurality miniature lenses.

Some embodiments disclosed herein may include method of making a plurality of miniature lenses including: providing a film on a substrate, where the film includes a polymer; transitioning the polymer to a viscous state to form a viscous state polymer; facilitating the formation of a plurality of miniature lenses from the viscous state polymer; and transitioning the viscous state polymer in the miniature lenses from the viscous state to a rigid state.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
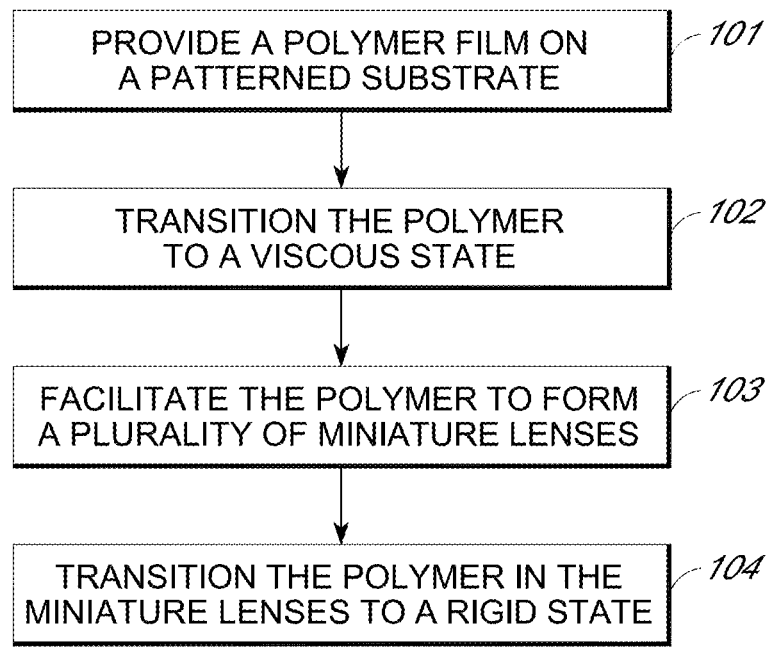
FIG. 1 is a flow diagram illustrating an example method of making a plurality of miniature lenses.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to miniature lenses. As used herein, "microlenses" and "nanolenses" are interchangeable and refer to miniature lenses having diameters in a range from about 200 nm to about 10 μm. The use of nanoscale materials and fabrication methods as disclosed herein may allow the development of ultrathin and submicron sized lenses with significantly improved optical characteristics.

Briefly stated, this application include techniques related to miniature lenses and lens arrays are generally described herein. The described techniques may be embodied in apparatuses, systems, methods and/or processes for making and using such lenses. In some examples, the various techniques may be utilized for miniature lenses such as nanometer to micron sized spherical lenses or lens arrays. An example process may include dewetting polymer films to form such lenses. The resulting lens-size may be tunable from about 200 nm to a few tens of microns, and more particularly in a range from about 200 nm to about 10 μm with spherical shapes of contact angles ranging from about 30° to about 150°. The resulting lenses may be tunable polymeric structures formed generally by self-organized room temperature dewetting of ultrathin polymer films by reducing the surface tension.

In accordance with the present disclosure, some example methods may use room temperature dewetting of polymer films under a mixture of water and organic solvents, e.g., acetone and methyl-ethyl ketone (MEK). Selective permeation of the organic solvents in the polymer may facilitate reduction of the glass transition temperature below the ambient temperature and may decrease the interfacial tension of the polymer. While not wishing to be bound by any particular theory, the presence of water in the bounding media is believed to enhance the destabilizing force field, which may enhance dewetting. Present embodiments may allow fabricating an ordered array of sub-micron lenses (e.g., about 200 nm diameter) where the lens curvature can be easily controlled.

FIG. 1 is a flow diagram illustrating an example method 100 of making a plurality of miniature lenses in accordance with at least some examples of the present disclosure. As illustrated in FIG. 1, the method 100 may include one or more functions, operations, or actions as illustrated by one or more of operations 101-104. Operations 101-104 may include a "Provide a Polymer Film on a Patterned Substrate" operation 101, a "Transition the Polymer to a Viscous State" operation 102, a "Facilitating the Polymer to Form a Plurality of Miniature Lenses" operation 103, and/or a "Transition the Polymer in the Miniature Lenses to a Rigid State" operation 104.

In FIG. 1, operations 101-104 are illustrated as being performed sequentially, with operation 101 first and operation 104 last. It will be appreciated, however, that these operations may be re-ordered as convenient to suit particular embodiments, and that these operations or portions thereof may be performed concurrently in some embodiments.

Method 100 may begin at operation 101, "Provide a Polymer Film on a Patterned Substrate." In operation 101, a generally uniform film of polymer may be cast onto a patterned substrate or surface. The polymer may be provided using any placement technique. A non-limiting example of a placement technique is spin-coating the polymer onto the substrate.

In general, the polymer film can be a film fabricated from a polymer. The polymer can be any polymer that is a least partially soluble in a solvent used in the "Transition the Polymer to a Viscous State" operation 102, discussed below. In some embodiments, the polymer may be transparent. In some embodiments, the polymer may be amorphous. The weight average molecule weight of the polymer is not limited, but may be, for example, at least about 5,000 Da; at least about 10,000 Da; at least about 50,000 Da; at least about 100,000 Da; or at least about 200,000 Da. The polymer can be, for example, a homopolymer or copolymer, such as a random copolymer, a block copolymer, or a graft copolymer. Non-limiting examples of polymers for the polymer film include polyacrylates, polymethacrylates, poly(vinyl ethers), polybutadiene, and the like. In some embodiments, the polymer is polystyrene (PS), polymethylmethacrylate (PMMA), and/or combinations thereof.

Other materials, besides the one or more polymers, may be included in the polymer film, if desired. The other materials can be, for example, metals, ceramics, and various additives (e.g., plasticizers, etc.). The amount of other materials in the polymer film can be, for example, less than about 50% by weight; less than about 20% by weight, less than about 10% by weight; less than about 5% by weight; or less than about 1% by weight. In some embodiments, the polymer film may be substantially free of non-polymeric materials.

In some embodiments, the polymer film can be a thin film. For example, the polymer film may have a thickness of about 200 nm or less, and in some examples about 100 nm or less. In some embodiments, the polymer film may be formed having a thickness in a range of about 10 nm to about 60 nm. In some embodiments, the polymer films have a generally uniform thickness in a range from about 75% to about 125% of an average thickness. In some embodiments, the polymer films have a generally uniform thickness in a range from about 90% to about 110% of an average thickness.

Still referring to operation 101, the surface or substrate having the polymer may be patterned. For example, the patterned substrate may include one or more regular patterns. In such regular patterns, at least one of the regular patterns includes one or more structures positioned at predetermined intervals or having a predetermined pitch between the structures. The predetermined intervals may, for example, be less than about 100 μm, be less than about 50 μm, be less than about 25 μm, be less than about 10 μm, be less than about 5 μm, be less than about 2 μm, or be less than about 1 μm. The predetermined intervals may, for example, be greater than about 200 nm, be greater than about 500 nm, or be greater than about 1 μm.

In some embodiments, the predetermined intervals may be from about 200 nm to about 100 μm. In some embodiments, the structures may be any shape, such as cylindrical pillars or pegs. The structures may be formed on the substrate by any suitable method. In some embodiments, the structures are formed using lithography techniques. For example, the structure may be etched onto the substrate using electron beam lithography (EBL).

The patterning on the substrate is optional, and in some embodiments, miniature lenses may be formed without any pattern on the substrate. The miniature lenses can be produced without the patterning using generally the same techniques disclosed herein (e.g., by performing operations 101-104 in FIG. 1). For example, miniature lenses may be prepared from a polymer film on a silicon-based substrate without any patterns. The polymer can be transitioned to a viscous state that is maintained until miniature lenses are formed. In some embodiments, individual lenses may be removed from the substrate, as desired. For example, miniature lenses within a predetermined size range can be removed. As another example, the miniature lenses can be removed and isolated based upon size and/or weight (e.g., by filtering, sifting, centrifuging, and the like).

The surface or substrate may be fabricated from any material from which the polymer film can perform the "Transition the Polymer to a Viscous State" operation 102, "Facilitate the Polymer to Form a Plurality of Miniature Lenses" operation 103, and "Transition the Polymer in the Miniature Lenses to a Rigid State" operation 104. While not wishing to be bound by any particular theory, it is believed that that the surface tension between the polymer film and the substrate will affect the structure of the miniature lens that is formed (e.g., contact angle, etc.). In some embodiments, a hydrophilic substrate may be used. For example, a silicon wafer may be used as the substrate. The substrate can be, in some embodiments, a silicon wafer having an oxide layer. The thickness of the oxide is not particularly limited. Other non-limiting examples of materials for the substrate include glass and quartz (fused silica). In some embodiments, the substrate may be hydrophobic, which as discussed above, may produce lenses of different sizes and shapes.

Operation 101 may be followed by operation 102, "Transition the Polymer to a Viscous State." In operation 102, the polymer film may be introduced to a solvent capable of causing the polymer films to begin dewetting. The polymer film may be introduced to the liquid solvent using any exposure technique. Example exposure techniques include, but are not limited to, using a dewetting chamber where a solvent can be contacted with the polymer film. For example, the polymer film can contact a liquid solvent or a solvent vapor in the dewetting chamber. In some embodiments, the polymer films may be annealed prior to placement in a dewetting chamber to minimize residual stresses developed during application to the substrate, e.g., spin coating.

The present disclosure appreciates that when a polymer thin-film (e.g., a thickness less than about 100 nm) is heated above its glass transition temperature ($T_g$) or $T_g$ is decreased by solvent exposure, the inter-surface interactions such as the van der Waals may engender the formation of holes which grow and coalesce to eventually form isolated spherical droplets. The size and the mean distance between these droplets may be on the order of 10s of microns and may be a function, in part, of the film thickness. Further the shape of the droplet may depend on the interfacial tension or the equilibrium contact angle. These smooth droplets when quenched to their glassy or rigid state may function as miniature lenses. However, dewetting in air may produce relatively large droplets of small contact angle which may be randomly distributed on the substrate.

In some embodiments, the methods disclosed herein may use a solvent which switches the destabilizing field from van der Waals to electrostatic and may decrease the interfacial tension in the polymer. This may result in the significantly smaller polymer droplets, e.g., than dewetting in air, with relatively large contact angles.

In some embodiments, the solvent or solvent mixture used may include water and one or more organic solvents. The type of organic solvents is generally not limited and will be selected based on various factors, such as the polymer and desired structure of the miniature lenses (e.g., diameter and contact angle). The organic solvents may be polar solvents or non-polar solvents. The organic solvents may be aprotic solvents or protic solvents. In some embodiments, the organic solvents are polar aprotic solvents. In some embodiments, the one or more organic solvents are miscible in water.

The organic solvents, for example, may be selected from acetone, methyl-ethyl ketone (MEK), tetrahydrofuran (THF), and the like. For example, in some embodiments, the solvent includes water, acetone, and MEK having a ratio of about 15:3:7 (water:acetone:MEK). As one example, keeping the ratio of MEK and acetone fixed (7:3) and changing the water content in the mixture, the solvent may be used having a range of about 10:3:7 to 22:3:7 (water:acetone:MEK). In such an example, if the water content is increased above 22, the polymer films may dewet poorly and if the water content is decreased below 10, the polymer films may begin to dissolve in the solvent mixture. In some embodiments, having the water ratio less than 10 may be suitable so long as the rate of dissolution of the polymer in the solvent mixture is slow compared to dewetting time so that the polymer is not completely dissolved before dewetting is completed.

The present disclosure appreciates that MEK is generally a good solvent for polymers such as PS, but may be sparingly miscible with water and thus, the two components may generally be immiscible. Acetone may be used, in part, as an agent to facilitate mixing of MEK and water to obtain a generally homogenous mixture of water and organic solvents. Thus, in some embodiments, acetone may be used to make MEK and water miscible with each other.

In some embodiments, the solvent may include water, THF and optionally acetone. The present disclosure appreciates that THF is generally a good solvent for polymers and can be miscible in water. THF may be used in generally the same ratio as MEK.

In some embodiments, the temperature of the polymer film can be adjusted to transition the polymer to a viscous state. The temperature may be adjusted, in some embodiments, without exposing the polymer to any solvents. For example, the polymer can be transitioned to a viscous state by raising the temperature above $T_g$. In some embodiments, the polymer can be exposed to a solvent and the temperature can be increased in combination to transition the polymer to a viscous state.

The present disclosure appreciates that the solvent mixture may be selected to adjust the interfacial tension. For example, the amount of water in the solvent mixture relative to less polar solvents (e.g., THF or MEK) may affect the interfacial surface tension, which in turn may affect the size and/or contact angle of the miniature lenses.

Operation 102 may be followed by operation 103, "Facilitating the Polymer to Form a Plurality of Miniature Lenses." In operation 103, the polymer may be maintained in the viscous state for a sufficient time to form the plurality of miniature lenses. Thus, in some embodiments, the dewetting process may be facilitated by maintaining the polymer in a viscous state, which may permit the polymer to reduce the interfacial surface tension by forming lenses. In some embodiments, the lenses may form at regular intervals that correspond to the predetermined intervals of the patterned structures on the substrate. As one example, the polymer may be maintained in contact with the same solvent mixture used to dewet the polymer to facilitate forming lenses. As another example, the temperature may be maintained above $T_g$ to facilitate forming lenses. The conditions to facilitate forming miniature lenses can be the same or different from the conditions for transitioning the polymer to a viscous state in operation 102.

Operation 103 may be followed by operation 104, "Transition the Polymer in the Miniature Lenses to a Rigid State." In operation 104, dewetting may be completed and the solvent can be at least partially (or substantially completely) removed from the polymer. For example, drying can be utilized to ensure that dissolution stops and that the polymer in the lenses returns to a rigid state, e.g., the glass transition temperature ($T_g$) is above ambient conditions. The amount of solvent removed, in some embodiments, may be effective to increase $T_g$ above ambient conditions. The amount of solvent remaining in the polymer after operation 103 may be, for example, less than about 5% by weight; less than about 2% by weight; less than about 1% by weight; or less than about 0.1% by weight.

In some embodiments, the temperature can be adjusted to transition the miniature lenses to a rigid state. The temperature may be adjusted without removing any solvents. For example, if the polymer film is transitioned to a viscous state by heating and without contacting a solvent, then cooling the polymer may transition the miniature lenses to a rigid state. In some embodiments, the temperature is adjusted and the solvent can be at least partially removed.

The present disclosure appreciates that the size of the miniature lenses can vary depending upon various factors, such as the solvent mixture, type of polymer, thickness of the polymer film, size of the regular pattern, etc. The miniature lenses may have, for example, an average diameter of about 200 nm, about 400 nm, about 600 nm, about 800 nm, about 1 μm, about 2 μm, about 10 μm, about 20 μm, about 50 μm, about 100 μm, or any range defined about any two of these values. In some embodiments, each miniature lens has a diameter that is from about 70% to about 130% of the average diameter for the plurality of miniature lenses. In some embodiments, each miniature lens has a diameter that is in a range from about 90% to about 110% of the average diameter for the plurality of miniature lenses. In some embodiments, at least 90% of the miniature lenses have a diameter of, for example, less than about 200 nm; less that about 400 nm; less that about 600 nm; less that about 800 nm; less that about 1 μm; less that about 2 μm; less that about 10 μm; less that about 20 μm; less that about 50 μm; or less than about 100 μm. In some embodiments, at least 90% of the miniature lenses have a diameter of, for example, less than about 200 nm; greater that about 400 nm; greater that about 600 nm; greater that about 800 nm; greater that about 1 μm; greater that about 2 μm; greater that about 10 μm; greater that about 20 μm; greater that about 50 μm; or greater than about 100 μm.

The present disclosure also appreciates that the contact angle of the miniature lenses can vary depending upon various factors, such as the dewetting time, solvent mixture, type of polymer, thickness of the polymer film, size of the regular pattern, etc. The miniature lenses may have, for example, an average contact angle of about 30°, about 50°, about 70°, about 90°, about 110°, about 130°, about 150°, or any range defined about any two of these values. In some embodiments, each miniature lens has a contact angle that is from about 70% to about 130% of the average contact angle for the plurality of miniature lenses. In some embodiments, each miniature lens has a contact angle that is from about 90% to about 110% of the average contact angle for the plurality of miniature lenses.

FIG. 2 a schematic diagram (not to scale) illustrating an example system including a patterned substrate for preparing a plurality of miniature lenses disposed thereon, arranged in accordance with at least some examples of the present disclosure. FIG. 2A shows a top view of patterned substrate 200 which may be used to form lenses. Patterned substrate 200 can include a substrate 210 and plurality of structures 220 that can be spaced at predetermined intervals. FIG. 2B shows a perspective view of system 200.

As discussed above, structures 220 can be, for example, pillars formed on a silicon wafer by EBL. As explained above, structures 220 may be positioned at predetermined intervals, thereby forming regular patterns. In some embodiments, the predetermined intervals may correlate to a repeating unit, e.g., the patterns have a repeating unit related to the intervals of the structures 220. In some embodiments, the length or size of the repeating unit corresponds to the size of the produced miniature lenses. Thus, the length of the repeating unit may be, for example, at least about 100 nm; at least about 200 nm; at least about 500 nm; or at least about 1 μm. The length of the repeating unit may be, for example, no more than about 100 μm; no more than about 50 μm; no more than about 25 μm; no more than about 10 μm; or no more than about 1 μm. In some embodiments, the length of the repeating unit is in a range from about 100 nm to about 100 μm. In some embodiments, the structures may form a two-dimensional lattice. Non-limiting examples of lattices that may be formed by the structures include a rhombic lattice, a hexagonal lattice, a square lattice, a rectangular lattice, or a parrallelogrammic lattice.

Figure 2A:
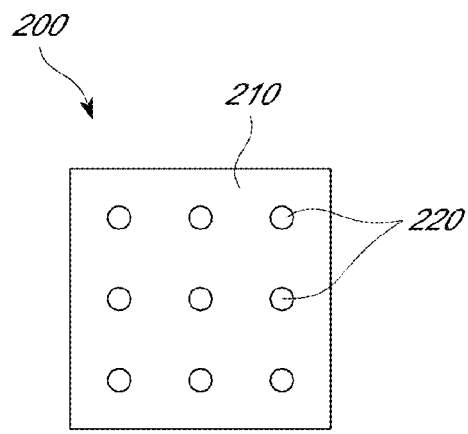
FIGS. 2A-2F are a schematic diagram (not to scale) illustrating an example system including a patterned substrate for preparing a plurality of miniature lenses disposed thereon.
Figure 2B:
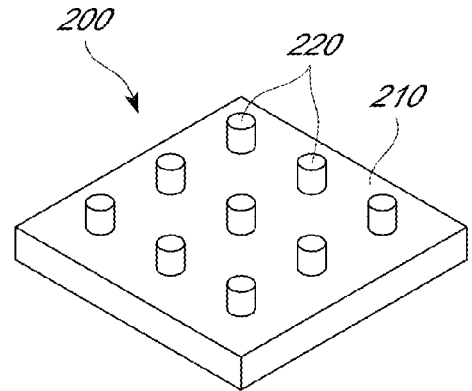
Figure 2C:
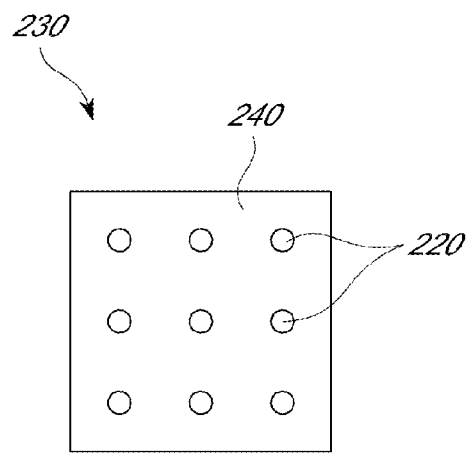
Figure 2D:
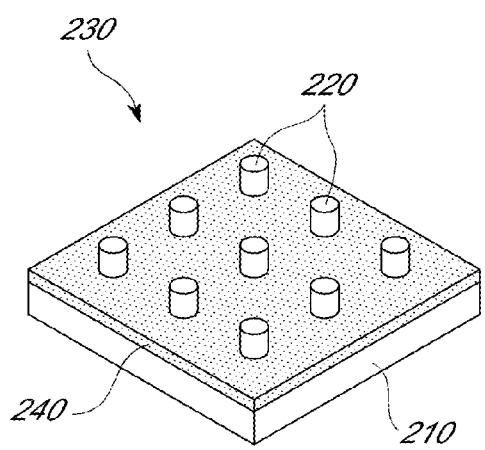

FIG. 2C shows a top view of patterned substrate 230 including polymer film 240 on substrate 210 (not shown). FIG. 2D shows a perspective view of patterned substrate 230 having polymer film 240 disposed on substrate 210. As discussed above, polymer film 240 may be formed, for example, using conventional methods, such as spin-coating. Patterned substrate 230 having polymer 240 can be used, in some embodiments, to perform operation 101 depicted in FIG. 1.

Figure 2E:
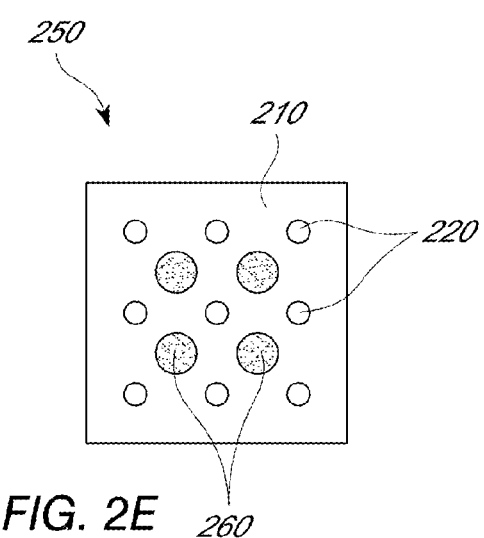
Figure 2F:
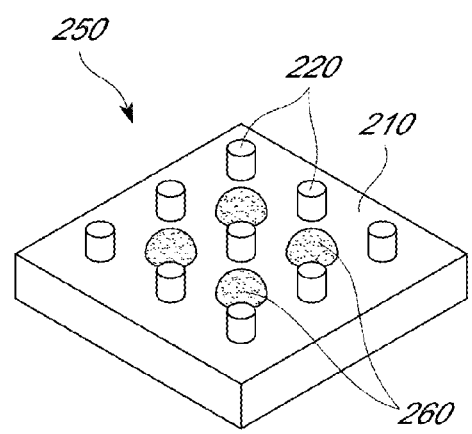

FIG. 2E shows a top view of a patterned substrate 250 having plurality of miniature lenses 260 formed on the substrate 210. FIG. 2F shows a perspective view of the system of FIG. 2E. The plurality of miniature lenses 260 may be obtained, in some embodiments, using patterned substrate 230 having polymer film 240 by performing operations 102 and 103 depicted in FIG. 1. As shown, plurality of miniature lenses 260 may form in regions corresponding to the location of plurality of structures 220. For example, as shown, each lens may be approximately equidistant to the four closest structures. In some embodiments, each lens may be approximately equidistant from three or more structures that are located closest to the lens. In some embodiments, the miniature lenses can be positioned apart at a repeating interval that is about the same as the repeating interval for the structures on the substrate.

The number of miniature lenses obtained on the patterned substrate may vary depending upon, for example, the size of the patterned substrate and the size of the repeating units. In some embodiments, the number of lenses formed on the patterned substrate is about the same as the number of repeating units on the patterned substrate. The total amount of miniature lenses obtained on the patterned substrate may be, for example, at least about 4; at least about 10; at least about 25; at least about 50; at least about 100; at least about 500; or at least about 1,000.

Figure 3:
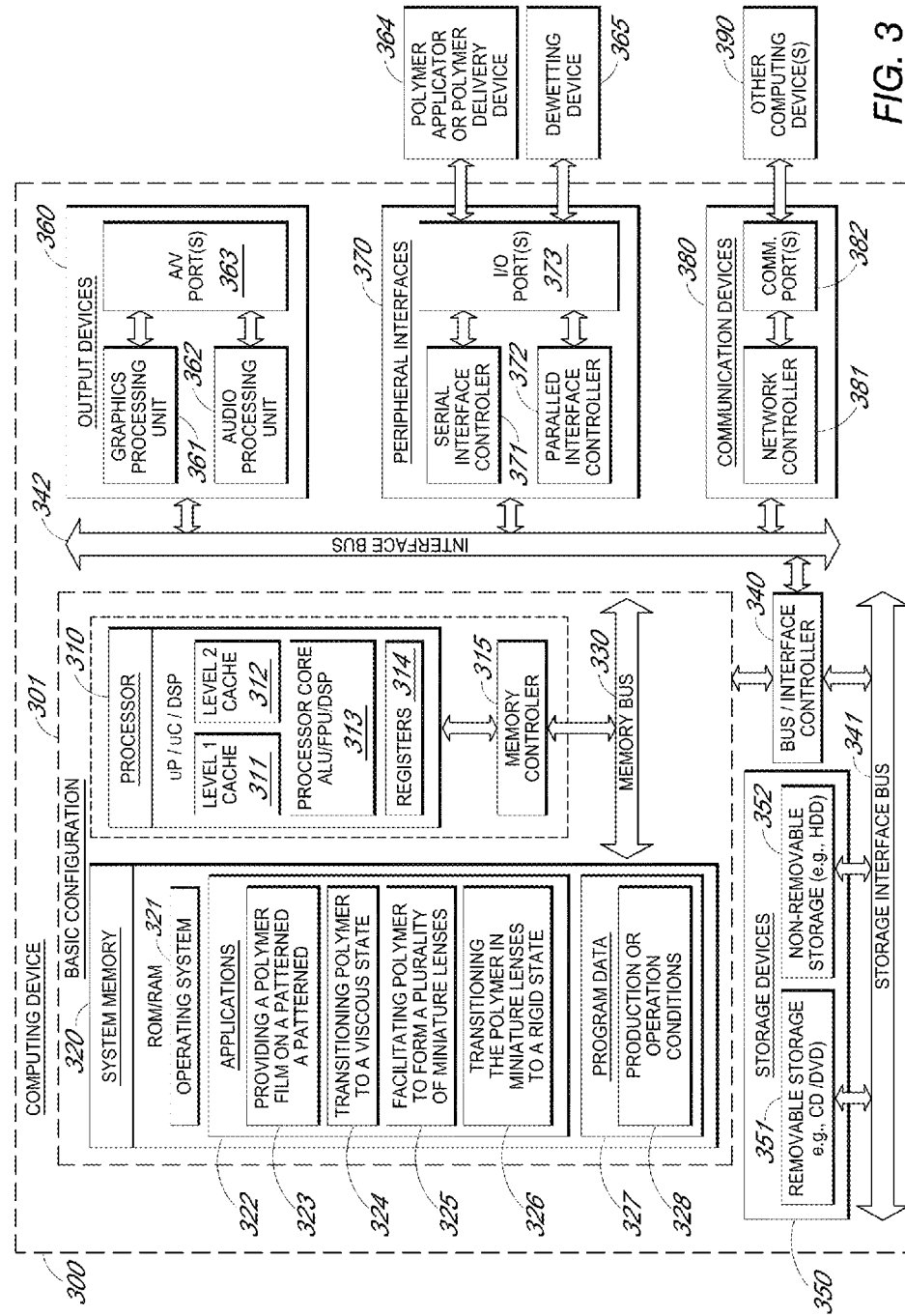
FIG. 3 is a block diagram illustrating a computing device as one example of a device that may be configured to control one or more operations.

FIG. 3 is a block diagram illustrating a computing device 300 as one example of a device that may be configured to control one or more operations in accordance with at least some examples of the present disclosure. For example, operations for the flow diagrams of FIG. 1 may be performed by computing device 300 including, but not limited to, providing a polymer film on a patterned substrate 323, transitioning the polymer to a viscous state 324, facilitating the polymer to form a plurality of miniature lenses 325, and transitioning the polymer in the miniature lenses to a rigid state 326. In a very basic configuration 301, computing device 300 typically includes one or more controllers or processors 310 and system memory 320. A memory bus 330 may be used for communicating between the processor 310 and the system memory 320.

Depending on the desired configuration, processor 310 may be of any type including but not limited to a microprocessor (µP), a microcontroller (µC), a digital signal processor (DSP), or any combination thereof. Processor 310 may include one or more levels of caching, such as a level one cache 311 and a level two cache 312, a processor core 313, and registers 314. The processor core 313 may include an arithmetic logic unit (ALU), a floating point unit (FPU), a digital signal processing core (DSP Core), or any combination thereof. A memory controller 315 may also be used with the processor 310, or in some implementations the memory controller 315 may be an internal part of the processor 310.

Depending on the desired configuration, the system memory 320 may be of any type including but not limited to volatile memory (such as RAM), non-volatile memory (such as ROM, flash memory, etc.), or any combination thereof. System memory 320 typically includes an operating system 321, one or more applications 322, and program data 327. As discussed above, applications 323-326 may include, for example, providing a polymer film on a patterned substrate, transitioning the polymer to a viscous state, facilitating the polymer to form a plurality of miniature lenses, and transitioning the polymer in the miniature lenses to a rigid state. Program data 327 may include, for example, miniature lens production data or operating conditions data 328 that are used by one or more of applications 323-326.

Computing device 300 may have additional features or functionality, and additional interfaces to facilitate communications between the basic configuration 301 and any required devices and interfaces. For example, a bus/interface controller 340 may be used to facilitate communications between the basic configuration 301 and one or more data storage devices 350 via a storage interface bus 341. The data storage devices 350 may be removable storage devices 351, non-removable storage devices 352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 320, removable storage 351, and non-removable storage 352 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 300. Any such computer storage media may be part of device 300.

Computing device 300 may also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which may be configured to communicate to various external devices such as a display or speakers via one or more A/V ports 363. Example peripheral interfaces 370 include a serial interface controller 371 or a parallel interface controller 372, which may be configured to communicate with external devices such as input devices (e.g., keyboard, mouse, pen, voice input device, touch input device, etc.) or other peripheral devices (e.g., printer, scanner, etc.) via one or more I/O ports 373. For example, in this embodiment, a polymer applicator or polymer delivery device 364 and/or a dewetting device 365 may be connected via an I/O port and used to deposit a polymer onto a substrate. An example communications device 380 includes a network controller 381, which may be arranged to facilitate communications with one or more other computing devices 390 over a network communication via one or more communication ports 382.

The communications connection is one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Figure 4:
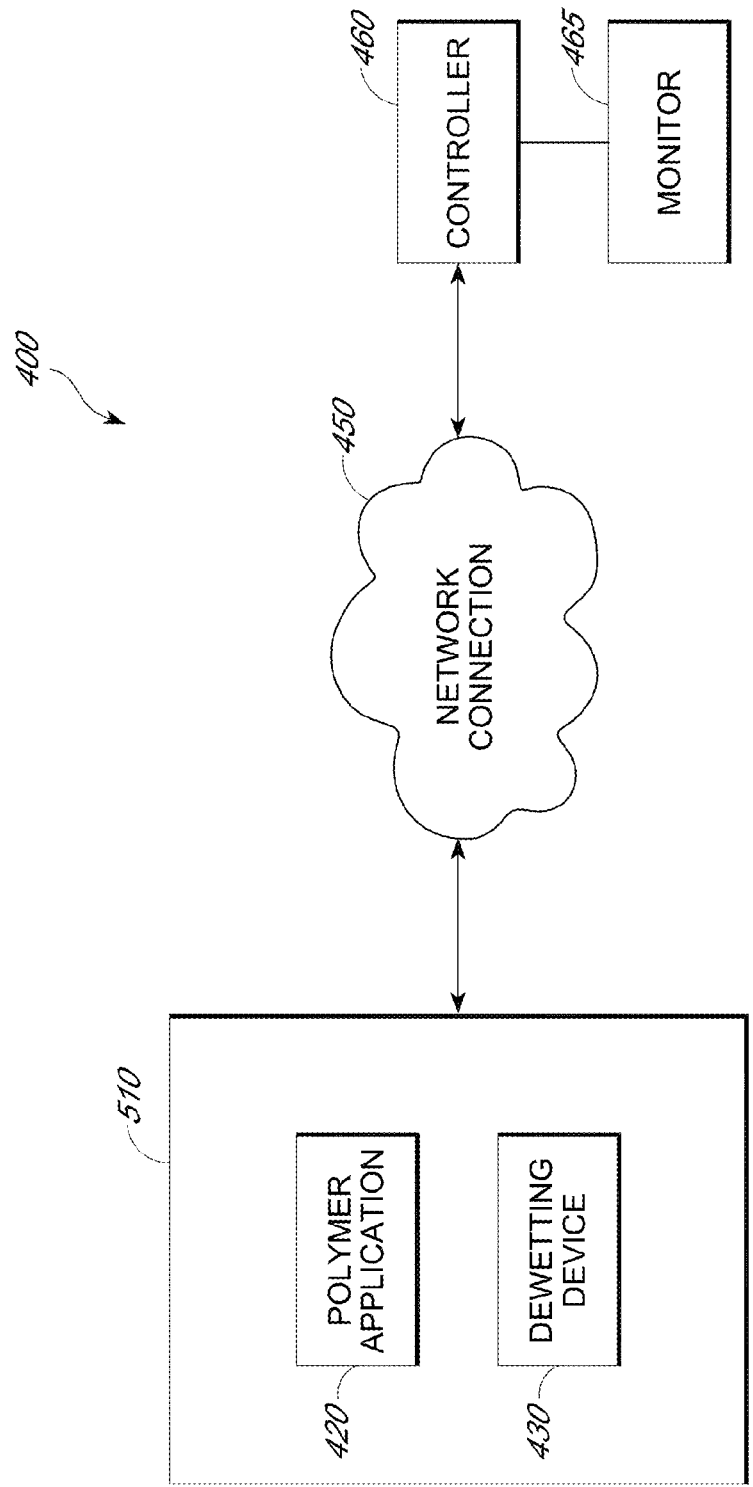
FIG. 4 is a block diagram illustrating a system that may be configured to control one or more operations.

FIG. 4 is a block diagram illustrating a system 400 that may be configured to control one or more operations in accordance with at least some examples of the present disclosure. For example, equipment for performing operations for the flow diagrams of FIG. 1 may be included in system 400. System 400 may include a processing plant or facility 410 arranged in communication with a controller or processor 460. Processor or controller 460 may be the same or different as controller or processor 310 described in FIG. 3. In one embodiment, processing plant 410 may be adapted to communicate with controller 460 via a network connection 450. Network connection 450 may be a wireless connection or a wired connection.

In some embodiments, controller 460 may be adapted to provide operating instructions for processing plant 410's operating conditions. Controller 460 may be adapted to receive information from processing plant 410 and utilize the information as feedback to adjust operating instructions to processing plant 410.

In some embodiments, the operating conditions may be presented on a monitor or display 465 and a user may interact with the operating conditions via a user interface (not shown). Monitor 465 may be in the form of a cathode ray tube, a flat panel screen such as an LED display or LCD display, or any other display device. The user interface may include a keyboard, mouse, joystick, write pen or other device such as a microphone, video camera or other user input device. Non-limiting examples of operating conditions that may be displayed on the monitor or display include the temperature, pressure, time period after transitioning the polymer to a viscous state, solvents applied to the polymer, type of patterned substrate (e.g., length of repeating unit), and the like.

In some embodiments, processing facility 410 may include a polymer applicator or delivery device 420 and/or a dewetting device 430. In some embodiments, polymer delivery device 420 may be configured via controller 460 to provide a polymer film to a patterned substrate. In some embodiments, polymer delivery device 420 may be a spin-coating device. In such embodiments, polymer delivery device 420 may include a reservoir containing one or more polymers.

Dewetting device 430 may be coupled to controller 460 and can be configured via controller 460 to dewet the polymer film at conditions sufficient to form a plurality of miniature lenses. In some embodiments, the dewetting device 430 may include a dewetting chamber or reservoir containing a solvent. The solvent may include organic fluid and the dewetting device 430 may be configured to contact the polymer film with the solvent. In some embodiments, the dewetting device 430 may perform the dewetting process at room temperature. As one example, the dewetting device may be a sealed chamber having an inlet for feeding the solvent in the chamber containing the patterned substrate having a polymer film. As another example, the dewetting device can be a furnace for heating the polymer above the glass transition temperature.

EXAMPLES

Additional embodiments are disclosed in further detail in the following examples, which are not in any way intended to limit the scope of the claims.

Example 1

In one example, Polystyrene (PS) of average molecular weight ($M_w$) 280,000 g mol$^{-1}$ was purchased from Sigma Aldrich and used as is. Polydispersity index (PDI=$M_w/M_n$) of the PS was less than 1.1. Thin-films of thickness ranging from about 10 nm to about 60 nm were spun coat at about 3000 rpm on a thoroughly cleaned silicon wafers with an oxide layer (about 2-3 nm measured by ellipsometry) by using about 0.1-1 w/v % polymer solution in HPLC grade toluene. After spin coating, the films were dried in air for about 2 hours and annealed in a low vacuum oven at about 60° C. for about 12 hours to minimize residual stresses developed during spin coating. A two-dimensional array of cylindrical pillars with a diameter of about 250 nm, a height of about 100 nm and pitch of about 1 μm were made on the silicon by EBL. EBL patterned silicon wafers were directly used for spin coating of PS films.

In order to test the optical performance of miniature lenses, PS films were coated on cleaned glass coverslips and dewetted structures on these transparent substrates were then used for imaging after annealing at about 110° C. for about 30 minutes. Annealing removed the residual solvents and also ensured contact angle of less than about 90°. Annealed thin-films of PS were put in a dewetting chamber containing a liquid mixture of water, acetone and methyl-ethyl ketone (MEK) in the ratio of about 15:3:7 and immersed in the MEK liquid mixture. The samples were removed at different time intervals to examine the extent of dewetting and fully dewetted samples were taken for the isolation of dewetted structures. Thickness measurements of spin coated thin films were carried out by nulling ellipsometer (Nanofilm, EP$^3$-SE) using about 532 nm green laser at an incident angle of about 55°. The refractive index of PS was taken as the value for bulk, e.g., 1.58.

Imaging of the fabricated structures was done using an optical microscope (Zeiss Axio observer Z1) in bright field and FESEM (Zeiss Supra 40VP) using secondary electrons. To measure the contact angle of polymer droplets, substrates were examined vertically in FESEM to see the transverse view of droplets. Optical characterization of fabricated miniature lenses was done using optical microscopy.

Figure 5:
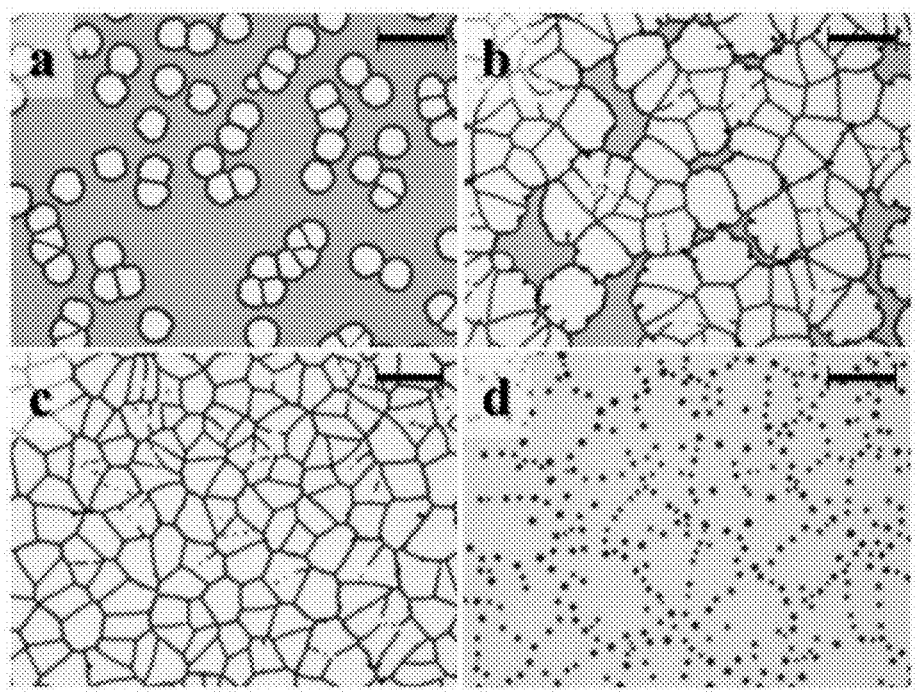
FIG. 5 is an image illustrating an example time evolution of dewetting of a 25 nm PS film on a flat silicon substrate under a solution containing water, acetone, and methyl ethyl ketone (MEK) solution.

FIG. 5 is an image illustrating an example time evolution of dewetting of a 25 nm PS film on a flat silicon substrate (i.e., without any patterned substrate) under water, acetone, and methyl ethyl ketone ("MEK") solution, in accordance with at least some examples of the present disclosure. The scale bar is 10 μm for each image in FIG. 5. Morphology of PS thin-film after (a) about 30 seconds as randomly distributed isolated holes, (b) about 2 minutes as partially coalesced holes, (c) about 6 minutes as completely coalesced holes forming a network and (d) about 15 minutes as isolated polymer droplets. On a flat homogeneous surface, dewetting of a thin polymer film may be due to the excess intermolecular forces. FIG. 5 shows that dewetting starts with the formation of randomly distributed isolated dry spots or holes on the film, which in time grow and coalesce to form a network of polymers that break into isolated droplets. For this film, the onset of instability was observed after about 10 seconds of placing the film inside the immersing liquid, e.g., water-MEK solution, which is significantly shorter than the time (several minutes) taken for dewetting in air saturated with solvent vapor. Nearly uniform sized holes can be seen on the film after about 30 seconds (FIG. 5(a)). The number of holes per unit area, N displayed approximately the scaling, $N \sim \lambda^{-2} \sim h^{-4}$ (results not shown). This resembles the theoretical scaling $\lambda \sim [(\partial \phi/\partial h)]^{-1/2}$ obtained for the van der Waals potential, $\phi \sim h^{-3}$. These holes grow in size and subsequently coalesce in about 6 minutes to form a network of polymer (FIGS. 5(b), 5(c)). Within about 15 minutes, this network of polymer may break into isolated droplets to complete the dewetting (FIG. 5(d)). After this stage there is substantially no further change in the overall morphology, but the contact-lines of individual droplets continue to slowly recede for about one hour. This decrease in the droplet base diameter may be accompanied by an increase in the equilibrium contact angle and the aspect ratio of the droplet. The slow kinetics of these droplets may be caused by the high viscosity of the polymer, which allows for a facile control of lens curvature by freezing a desired intermediate structure by removal from the water-MEK medium. The number density of droplets in the fully dewetted sample of 25 nm thick PS film is found to be about $3.9 \times 10^4$ mm$^{-2}$ that gives the mean separation of about 5.1±0.2 μm between droplets. The corresponding value for dewetting in air is about 24.2±1.9 μm. Thus, the mean droplet diameter obtained in water-MEK mixture is significantly smaller than droplets obtained by dewetting in air.

Figure 6:
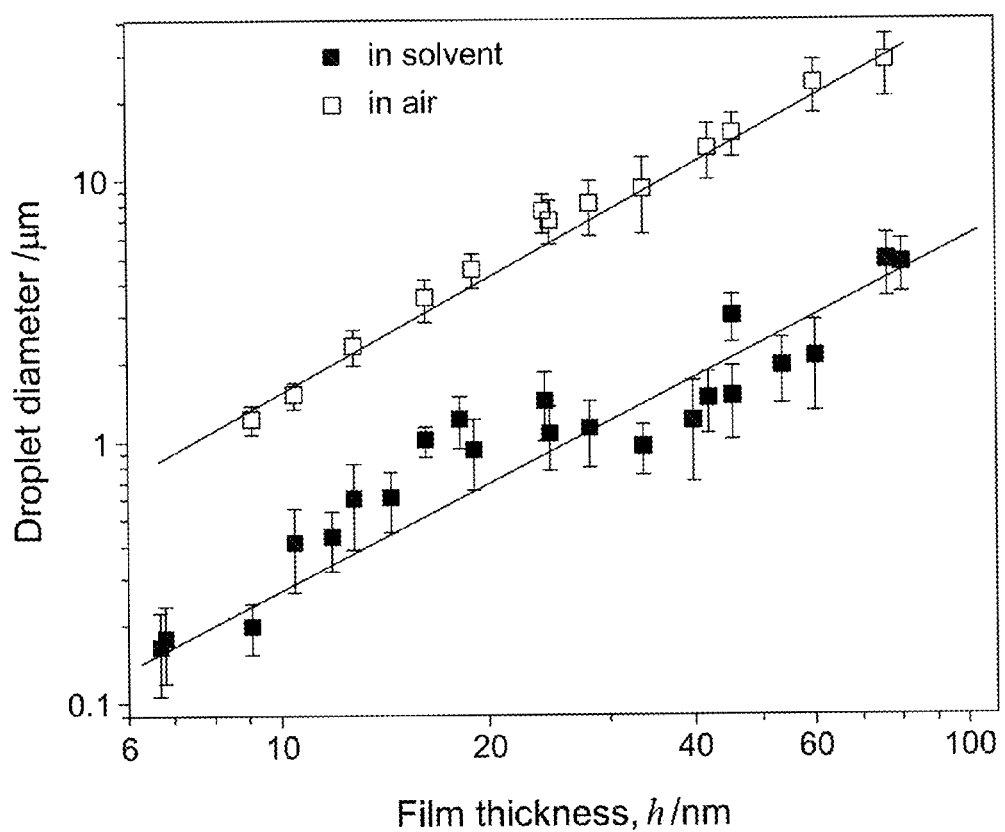
FIG. 6 is a graph illustrating an example comparison of the average droplet diameters for dewetting in air and in a water/acetone/MEK mixture.

FIG. 6 is a graph illustrating an example comparison of the average droplet diameters for dewetting in air and in a water/acetone/MEK mixture, in accordance with at least some examples of the present disclosure. As presented, FIG. 6 shows the droplet diameters, d, for both in air and in water as a function of film thickness, which shows nearly one order reduction in the droplet size. Moreover, the size dependence of the diameter on film thickness may also be weaker for dewetting under MEK mix, viz. $d \sim h^{-1.17 \pm 0.09}$ as opposed to $h^{-1.49 \pm 0.05}$ for dewetting in air. While not wishing to be bound by any particularly theory, it is believed that the size-reduction under MEK mix may be engendered by a decrease in the interfacial tension owing to the presence of the solvent and also because of anomalously strong destabilizing forces observed for thin liquid polymer films under water. Also, a weaker dependence on the film thickness, $d \sim h^{-1.17}$ appears consistent with a reduced exponent of the dominant electrostatic destabilizing force under water ($\phi \sim h^{-2.5}$) as compared to the van der Waals force in air ($\phi \sim h^{-3}$). The dewetted droplets were examined by placing the substrate vertically in the field emission scanning electron microscope (FESEM) to see the side view of these droplets.

Figure 7:
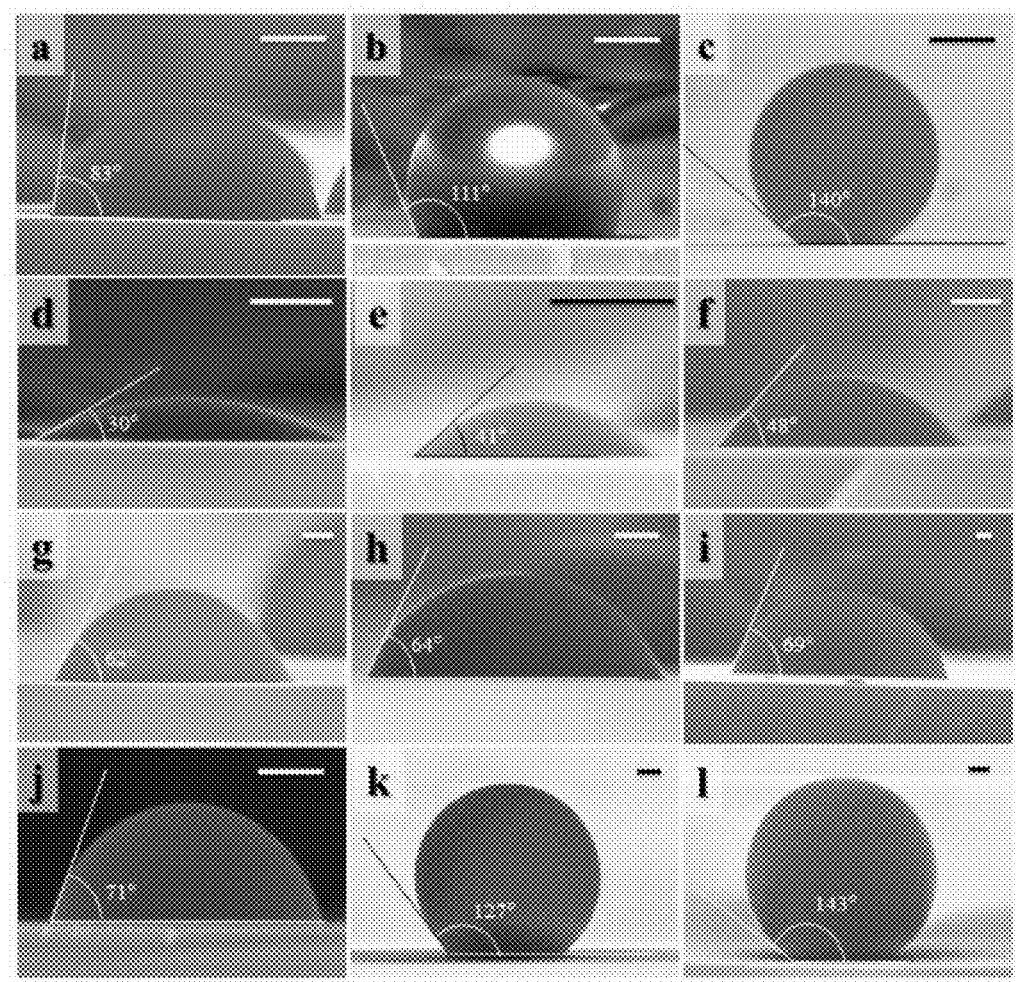
FIG. 7 is an image illustrating example transverse FESEM images of PS droplets.

FIG. 7 is a diagram illustrating example transverse FESEM images of PS droplets in accordance with at least some examples of the present disclosure. The scale bar is 200 nm for each image in FIG. 7. Images (a)-(c) show time evolution of a droplet obtained by dewetting of a 25 nm thick PS film on a flat silicon substrate. Images (d)-(l) show a range of droplet shapes and sizes obtained by dewetting of about 14-60 nm thick PS films on a flat silicon substrate. As presented, FIG. 7 shows evolution of contact angles of PS droplets with time. The contact angle slowly increases from about 83° after about 15 minutes of dewetting to about 140° after about 1 hour (FIGS. 7(a)-(c)). FIGS. 7(d)-(l) illustrate a variety of lenses obtained by dewetting of about 14-60 nm thick films producing droplets with the diameter and contact-angle in the range of about 370 nm to about 2.9 μm and about 30° to about 143°, respectively. It is evident from this figure that a significantly wide range of microlenses both in size and focal length can be fabricated using the methods according to the present disclosure. Additionally, all of these structures appear stable in air at room temperature.

In some embodiments, contact angles of less than about 40° were only observed in smaller droplets with a diameter less than about 800 nm. However, larger sized droplets with smaller contact angles can be made by heating them above their $T_g$ in air. This shape change may be completely reversible and once dried, droplets with all sizes and shapes may be stable at room temperature. The reversible shape changing capability of these miniature lenses may add to their flexibility to be used in optical devices. In order to obtain a uniform array of lenses, the dewetting of PS thin films was carried out on a pre-patterned substrate with a 2-D array of cylindrical pillars.

Figure 8:
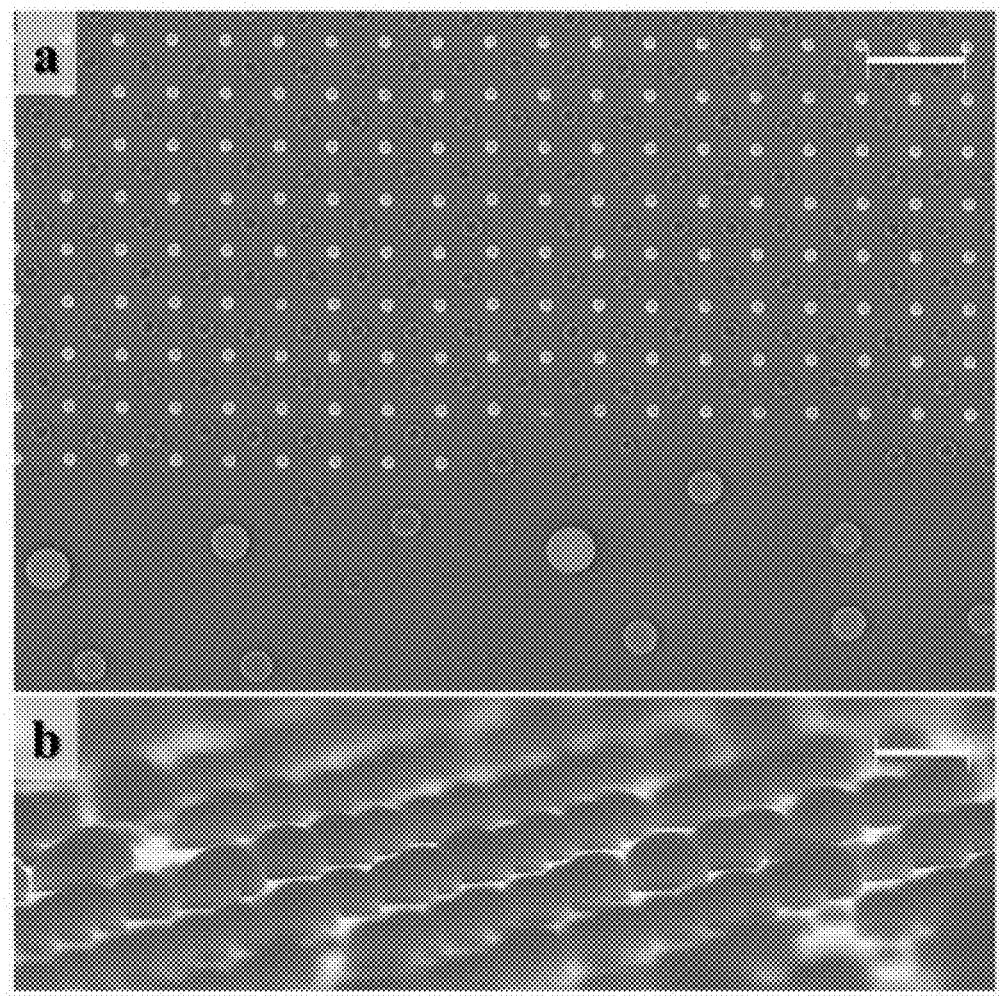
FIG. 8 is an image illustrating examples of dewetting on a physically patterned substrate.

FIG. 8 is a diagram illustrating example dewetting on a physically patterned substrate, in accordance with at least some examples of the present disclosure. Image (a) shows an FESEM image of the dewetted structure and image (scale bar is 2 μm) (b) is a transverse view showing arrays of dewetted droplets (scale bar is 500 nm). In FIG. 8(a) the brighter spots are the electron-beam lithography (EBL) fabricated cylindrical pillars, while the intervening spots are the polymer droplets. The effect of the pattern can be observed clearly as the alignment is seen only in the regions where the pre-fabricated pillars are present. 2-D confinement also further reduces the average size of droplets as well as the mean wavelength. In the transverse FESEM image, the array of polymer droplets can be seen (FIG. 8(b)).

Figure 9:
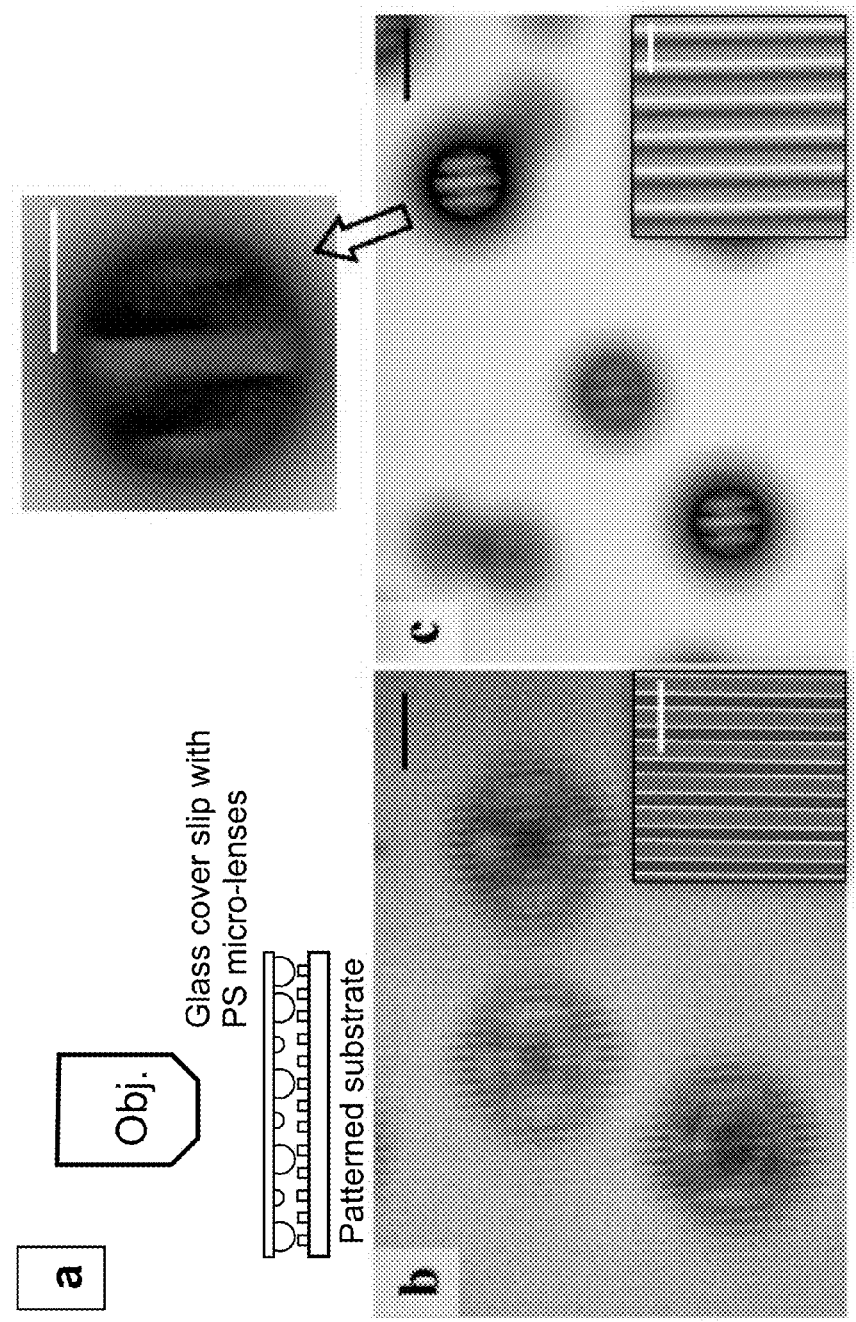
FIG. 9 is a block diagram illustrating resolving striped patterns in optical microscope by PS miniature lenses; all in accordance with at least some embodiments described herein.

FIG. 9 is a block diagram illustrating resolving striped patterns in optical microscope by PS miniature lenses in accordance with the present disclosure. (a) Schematic diagram of visualization using optical microscope. (b) 500 nm wide strips on silicon wafer resolved by 50× objective (NA/0.5), inset shows the FESEM image of the object. (c) CD strips with channel width of 800 nm resolved by 20×(NA/0.4) objective, enlarged view is of 50× objective, inset shows the FESEM image of the object. The black scale bar is 5 μm and the white scale bar is 2 μm. To see the lensing effect of fabricated PS miniature lenses, optical characterization was performed by putting a glass coverslip containing miniature lenses over the object to be seen in optical microscope. FIG. 9(a) displays the scheme of the arrangement, where miniature lenses are placed between the object and the objective lens of the microscope. The miniature lenses used here are about 3-7 μm in size with a contact angle close to about 70°. It seems evident from the images that the presence of miniature lenses adds to the resolution of the microscope; the pattern below the miniature lenses resolves better than the regions without miniature lenses. The effectiveness of PS miniature lenses in improving the resolution is evident with 500 nm wide parallel strips on silicon wafer (FIG. 9(b)) and 800 nm wide parallel tracks on a compact disk (CD) (FIG. 9(c)).

Dewetting of polymer films under a solvent thus may be a powerful but flexible, simple and inexpensive technique for the room temperature fabrication of submicron polymeric structures and spherical lenses by physical self-assembly. Further, self-organized dewetting of polymer thin films on a physically patterned surface is shown to produce a regular 2-D array of microlenses over a large area of the order of cm². While not wishing to be bound by any particular theory, the presence of water as the bonding fluid increases the contact angle of the droplet, whereas the heating in air can decreases the contact angle. This change may be completely reversible and may be used to make stimuli-responsive miniature lenses capable of changing their focal lengths when subjected to appropriate conditions. The lensing effect of these miniature lenses is also demonstrated and the miniature lenses fabricated according to the present disclosure appear to be promising in resolving smaller objects in an optical microscope.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system of miniature lenses, the system comprising:
a substrate comprising one or more patterns, wherein each of the patterns includes a repeating unit; and
a plurality of miniature lenses disposed on the substrate, wherein a size of the repeating unit corresponds to a size of the miniature lenses,
wherein at least one of the patterns comprises elevated structures at regular intervals, and
wherein each of the miniature lenses is disposed between the elevated structures.

2. A method of making the system of miniature lenses of claim 1, the method comprising:
providing a film on a substrate comprising one or more patterns, each of the patterns including a repeating unit, and wherein the film comprises a polymer;
transitioning the polymer to a viscous state to form a viscous state polymer;
facilitating the formation of a plurality of miniature lenses from the viscous state polymer; and
transitioning the viscous state polymer in the miniature lenses from the viscous state to a rigid state, wherein a size of the repeating unit corresponds to a size of the miniature lenses,
whereby said system of miniature lenses is formed.

3. The method of claim 2, wherein transitioning the polymer to viscous state comprises: reducing the glass transition temperature of the polymer and/or heating the polymer above the glass transition temperature of the polymer.

4. The method of claim 3, wherein reducing the glass transition temperature of the polymer comprises: contacting the polymer with a solvent effective to reduce the glass transition temperature of the polymer.

5. The method of claim 4, wherein the solvent comprises water and one or more organic solvents selected from the group consisting of: acetone, methyl-ethyl ketone, tetrahydrofuran, and/or combinations thereof.

6. The method of claim 5, wherein the solvent comprises water in a range of about 30% to about 90% by volume, acetone in a range of about 5% to about 20% by volume, and methyl-ethyl ketone in a range of about 20% to about 40% by volume.

7. The method of claim 4, wherein transitioning the polymer in the miniature lenses to the rigid state comprises: removing the solvent from polymer and/or cooling the polymer below the glass transition temperature.

8. The method of claim 2, wherein the polymer comprises one or more polymers selected from the group consisting of: polystyrene, polyacrylates, polymethacrylates, poly(vinyl ethers), polybutadiene, and/or combinations thereof.

9. The method of claim 8, wherein the polymer is selected from the group consisting of: polystyrene, polymethylmethacrylate, and/or combinations thereof.

10. The method of claim 2, wherein at least one of the patterns in the substrate comprises a plurality of structures positioned at predetermined intervals.

11. The method of claim 10, wherein the predetermined intervals are less than about 1,000 μm.

12. The method of claim 2, wherein the film is less than about 200 nm in thickness.

13. The method of claim 2, wherein the miniature lenses comprise lenses having a diameter in a range of about 200 nm to about 10 μm.

14. The method of claim 2, wherein the miniature lenses are generally spherical in shape.

15. The system of claim 1, wherein the plurality of miniature lenses each comprise at least 50% by weight of one or more common polymers.

16. The system of claim 15, wherein the one or more common polymers are selected from the group consisting of polystyrene, polyacrylates, polymethacrylates, poly(vinyl ethers), polybutadiene, and/or combinations thereof.

17. The system of claim 16, wherein the common polymer is selected from the group consisting of polystyrene, polymethylmethacrylate, and/or combinations thereof.

18. The system of claim 1, wherein at least one of the patterns comprises a plurality of structures positioned at predetermined intervals.

19. The system of claim 1, wherein the substrate comprises a silicon layer.

20. The system of claim 1, wherein the miniature lenses are generally spherical in shape.

21. The system of miniature lenses of claim 1, wherein:
the plurality of miniature lenses have an average contact angle in the range from about 50° to about 150°; and
each of the plurality of miniature lenses have a contact angle in the range from about 80% to about 120% of the average contact angle.

22. A method of making the system of miniature lenses of claim 21, the method comprising:
providing a film on a substrate, wherein the film comprises a polymer;
transitioning the polymer to a viscous state to form a viscous state polymer;
facilitating the formation of a plurality of miniature lenses from the viscous state polymer; and
transitioning the viscous state polymer in the miniature lenses from the viscous state to a rigid state, wherein the plurality of miniature lenses have an average contact angle in the range from about 50° to about 150°, and each of the plurality of miniature lenses have a contact angle in the range from about 80% to about 120% of the average contact angle
whereby said system of miniature lenses is formed.

23. The system of claim 1, wherein each of the miniature lenses is approximately equidistant to three or more of the elevated structures nearest to each miniature lens.

24. The system of claim 1, wherein at least one of the patterns comprises a rhombic lattice, a hexagonal lattice, a rectangular lattice, or a parrallelogrammic lattice.

25. The system of claim 1, further comprising:
a solvent, wherein the plurality of miniature lenses and the substrate are immersed in the solvent.

26. A system of miniature lenses, the system comprising:
a substrate comprising one or more patterns, wherein each of the patterns includes a repeating unit; and
a plurality of miniature lenses disposed on the substrate, wherein a size of the repeating unit corresponds to a size of the miniature lenses,
wherein the miniature lenses comprise lenses having a diameter in a range of about 200 nm to about 10 μm.

27. The system of claim 26, wherein each of the plurality of miniature lenses have a diameter in the range from about 80% to about 120% of the average diameter.

28. The system of claim 26, wherein the plurality of miniature lenses have an average contact angle in the range from about 30° to about 150°, and each of the plurality of miniature lenses have a contact angle in the range from about 80% to about 120% of the average contact angle.

29. The system of claim 26, wherein the plurality of miniature lenses have an average contact angle in the range from about 50° to about 150°.

* * * * *

UNITED STATES PATENT AND TRADEMARK OFFICE
CERTIFICATE OF CORRECTION

PATENT NO. : 8,587,881 B2  
APPLICATION NO. : 13/176565  
DATED : November 19, 2013  
INVENTOR(S) : Sharma et al.

Page 1 of 1

It is certified that error appears in the above-identified patent and that said Letters Patent is hereby corrected as shown below:

In the Drawings:

In Fig. 3, Sheet 3 of 9, for Tag "323", in Line 3, delete "A PATTERNED" and insert -- SUBSTRATE --, therefor.

In Fig. 3, Sheet 3 of 9, for Tag "315", in Line 2, delete "CONTROLER" and insert -- CONTROLLER --, therefor.

In Fig. 3, Sheet 3 of 9, for Tag "372", in Line 1, delete "PARALLED" and insert -- PARALLEL --, therefor.

In the Specification:

In Column 8, Line 25, delete "parrallelogrammic" and insert -- parallelogrammic --, therefor.

In the Claims:

In Column 17, Line 27, in Claim 22, delete "angle" and insert -- angle, --, therefor.

In Column 18, Line 6, in Claim 24, delete "parrallelogrammic" and insert -- parallelogrammic --, therefor.

Signed and Sealed this  
Fifteenth Day of April, 2014

Michelle K. Lee  
*Deputy Director of the United States Patent and Trademark Office*